(12) United States Patent
Sherlock et al.

(10) Patent No.: US 7,735,238 B2
(45) Date of Patent: Jun. 15, 2010

(54) NOZZLE TRAILING EDGE POSITION MEASUREMENT AND MARKING

(75) Inventors: Graham David Sherlock, Greenville, SC (US); Paul Lawrence Kalmar, Zirconia, NC (US)

(73) Assignee: General Electric Company, Schenectady, NY (US)

( * ) Notice: Subject to any disclaimer, the term of this patent is extended or adjusted under 35 U.S.C. 154(b) by 182 days.

(21) Appl. No.: 12/183,434

(22) Filed: Jul. 31, 2008

(65) Prior Publication Data

US 2010/0024238 A1 Feb. 4, 2010

(51) Int. Cl.
*G01B 5/02* (2006.01)
(52) U.S. Cl. .............................. 33/832; 33/833; 33/810
(58) Field of Classification Search .................. 33/783, 33/803, 810, 811, 812, 832, 833
See application file for complete search history.

(56) References Cited

U.S. PATENT DOCUMENTS

| | | | |
|---|---|---|---|
| 4,265,023 A * | 5/1981 | Frost et al. .................. 356/614 |
| 4,322,887 A * | 4/1982 | Burton ........................ 33/552 |
| 5,521,847 A | 5/1996 | Ostrowski et al. |
| 7,231,724 B2 | 6/2007 | Sherlock et al. |
| 7,387,492 B2 | 6/2008 | Pang et al. |
| 2005/0217131 A1 * | 10/2005 | Varsell et al. .................. 33/562 |
| 2007/0271807 A1 * | 11/2007 | Karwowski .................. 33/828 |
| 2010/0064537 A1 * | 3/2010 | Petroskie et al. .............. 33/533 |

* cited by examiner

*Primary Examiner*—G. Bradley Bennett
(74) *Attorney, Agent, or Firm*—Nixon & Vanderhye P.C.

(57) ABSTRACT

A measuring tool measures a trailing edge position of gas turbine nozzle. The tool includes a frame member attachable to at least one predefined reference point on the nozzle. At least one sliding member is slidable relative to the frame member and includes a measuring point engageable with the trailing edge. A position of the sliding member relative to the frame member is determinative of the trailing edge position.

12 Claims, 3 Drawing Sheets

NOZZLE TRAILING EDGE POSITION MEASUREMENT AND MARKING

BACKGROUND OF THE INVENTION

The invention relates to a measuring and marking tool for a gas turbine nozzle and, more particularly, to a tool and method for measuring and marking a trailing edge position of a gas turbine nozzle segment relative to a radial line from engine center.

When measuring the throat opening and pitch between trailing edges of adjacent nozzles, the datum that is commonly used is the airfoil trailing edge. If the trailing edge is damaged or blended during repair or operation, the trailing edge can no longer be relied on to be at the correct angle or position relative to assembly drawings.

It would be desirable to have a device and method capable of checking the position and attitude of the trailing edges prior to measurement of the throat area and harmonics. It is also desirable to enable airfoils to be accurately marked such that they could then be cut back after weld restoration to nominal position and for all the airfoil trailing edges in the set to be trimmed consistently such that the pitches between adjacent airfoil trailing edges is maintained consistently.

BRIEF DESCRIPTION OF THE INVENTION

In an exemplary embodiment, a tool measures a trailing edge position of gas turbine nozzle. The tool includes a frame member attachable to at least one predefined reference point on the nozzle. At least one sliding member is slidable relative to the frame member and includes a measuring point engageable with the trailing edge. A position of the sliding member relative to the frame member is determinative of the trailing edge position.

In another exemplary embodiment, the tool includes a frame member including a main frame and a sub-frame attachable to a plurality of predefined reference points on the nozzle, and at least one sliding plate disposed in an opening in the sub-frame. The sliding plate is slidable relative to the sub-frame and includes a measuring point engageable with the nozzle trailing edge. A plurality of graduations are defined on the frame member to identify the trailing edge position based on a position of the sliding plate relative to the graduations when the measuring point is engaged with the trailing edge.

In yet another exemplary embodiment, a method of measuring a trailing edge position of a gas turbine nozzle includes the steps of securing a frame member to at least one predefined reference point on the nozzle; and sliding at least one sliding member relative to the frame member until a measuring point engages the trailing edge, wherein a position of the sliding member relative to the frame member is determinative of the trailing edge position.

DETAILED DESCRIPTION OF THE INVENTION

Figure 1:
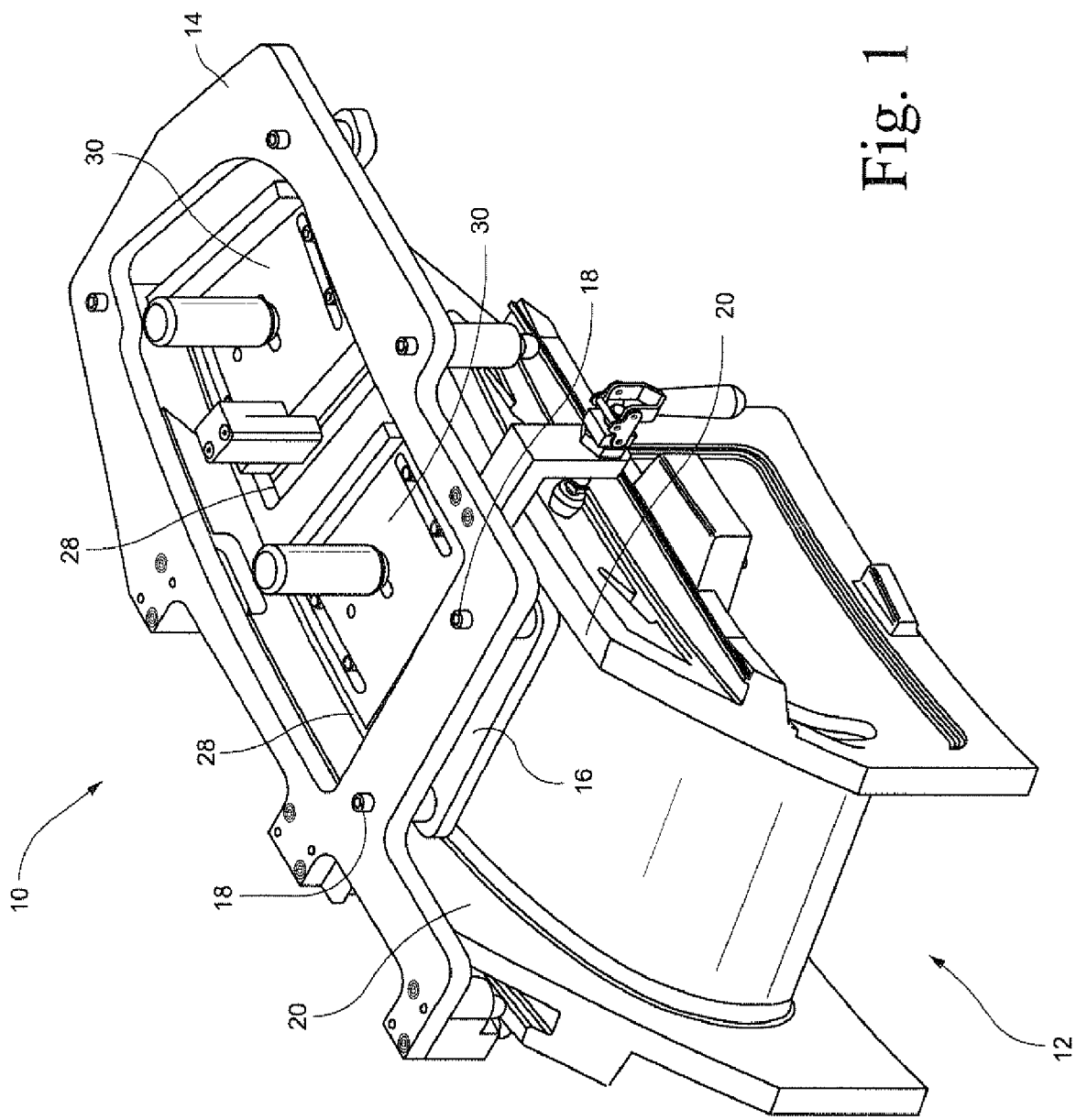
FIGS. 1 and 2 are perspective views of the measuring tool.

FIG. 1 is a perspective view of the measuring tool 10 installed on a nozzle segment 12. At new make of a nozzle segment, the machined features are created by first locating on the trailing edge and sidewalls of the airfoil. The machined features are therefore created precisely relative to the cast features. As noted, however, the airfoils and sidewall can distort and move during operation and/or repair. Certain of the machined features do not move, however, notably the outer radius, the anti-rotation slot, and the seal faces. These points can therefore be used as datums or reference points in order to determine the position of the airfoil after service and repair.

The tool 10 is comprised of a frame member including a main frame 14 and a sub-frame 16, which is suspended from the main frame 14 by suitable connectors 18. As shown, the sub-frame 16 is sized to fit between inner and outer bands 20 of the nozzle 12.

The main frame 14 is attachable to the nozzle segment 12 at one or more of a plurality of predefined reference points. With continued reference to FIGS. 1 and 2, the main frame 14 is provided with reference contacts 22 that bear on one or more, and preferably six, predefined reference points. As shown, the reference contacts 22 of the mainframe 14 may bear on the hook fit or chordal hinge (depending on nozzle type) 24 of the nozzle, on the outer radius 25 of the nozzle, and/or on the loaded side of the anti-rotation slot 26.

Figure 2:
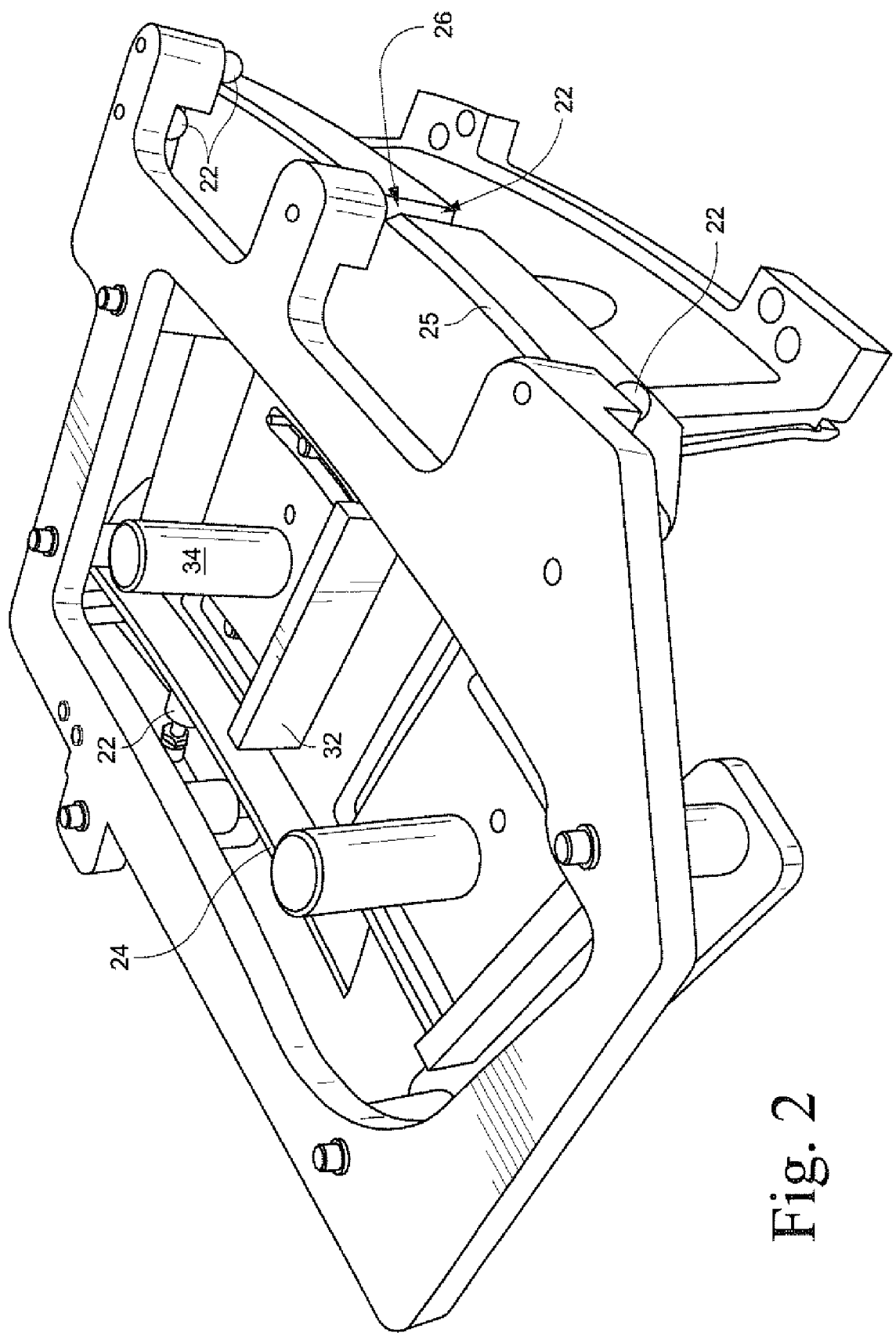

The sub-frame 16 includes at least one and preferably two openings 28 for receiving a corresponding one and preferably two sliding plates 30. Each plate 30 is slidable in its respective opening 28 and includes a measuring point 32 that is engageable with the nozzle trailing edge. Each plate 30 includes a 'measure' side and a 'scribe' side. In the tool shown in FIG. 2, the two plates are differently oriented for illustrative purposes. The right side plate in FIG. 2 is oriented in a scribing position (described in more detail below), and the left side plate is shown in a measuring position. In the scribing position, the measuring side of the plate 30 is shown with the measuring point 32 pointing upward. In the measuring position on the left side plate 30, the 'measure' side of the plate 30 is on the right end of the plate 30 with the measuring point 32 facing downward into the nozzle segment 12. When measuring, the measuring point 32 is engageable with the nozzle trailing edge.

Figure 3:
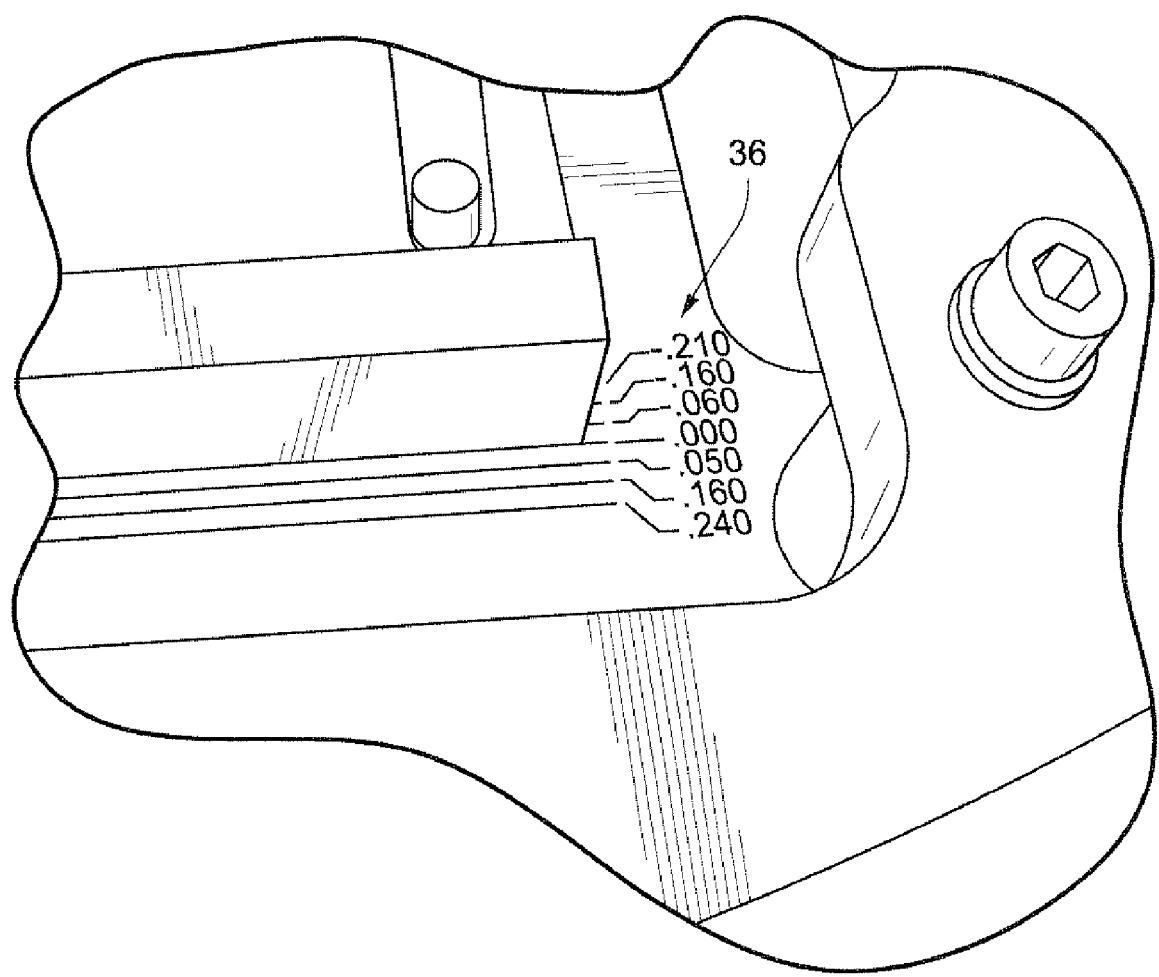
FIG. 3 is a close-up view showing graduations for measuring a position of the trailing edge or identifying a nominal position.

With the plate 30 in its measuring orientation, the plate 30 is slid in the opening 28 of the sub-frame member 16 until the measuring point 32 engages the trailing edge. The plate 30 can be locked in this position by a clamp 34 or the like. As shown in FIG. 3, the sub-frame 16 includes a plurality of graduations 36 used to identify the position of the trailing edge based on a position of the plate 30. With the 'measure' side of the plate 30 engaging the trailing edge, the 'scribe' side of the plate aligns with one of the graduations 36, and the position of the trailing edge can be determined.

With the plate 30 in the scribe orientation, the measuring point 32 does not extend below the sub-frame 16 to engage the trailing edge. In this orientation, the plate 30 can be set to a nominal position by positioning the 'measure' side of the plate 30 in line with an appropriate one of the graduations 36. With the nominal position established, a custom made scriber can be used to run along the front of the plate 30 and scribe a line on the nozzle airfoil. In this manner, the airfoils can be marked to a nominal position so they may be cut back after weld restoration to the nominal position and to ensure that the airfoil trailing edges in the set are trimmed consistently to thereby maintain consistency of the pitches between adjacent airfoil trailing edges.

The tool and methodology described herein provides for accurate trailing edge measurement and identification of nominal position. The tool is easy to use and is readily attachable to the turbine nozzle segments.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A tool for measuring a trailing edge position of gas turbine nozzle, the tool comprising:
    a frame member attachable to at least one predefined reference point on the nozzle; and
    at least one sliding member that is slidable relative to the frame member, the sliding member including a measuring point engageable with the trailing edge, wherein a position of the sliding member relative to the frame member is determinative of the trailing edge position.

2. A tool according to claim 1, wherein the frame member is attachable to at least two predefined reference points.

3. A tool according to claim 1, wherein the at least one predefined reference point comprises at least one of (1) a hook fit or chordal hinge, (2) an outer radius of the nozzle, and (3) an anti-rotation slot in the nozzle.

4. A tool according to claim 1, wherein the frame member comprises a main frame and a sub-frame, the main frame being attachable to the at least one predefined reference point, and the sub-frame being attachable to the main frame and sized to fit between an inner band and an outer band of the nozzle.

5. A tool according to claim 4, wherein the at least one sliding member comprises a sliding plate slidably disposed in a corresponding at least one opening in the sub-frame.

6. A tool according to claim 5, comprising two sliding plates slidably disposed in corresponding openings in the sub-frame.

7. A tool according to claim 5, wherein the sub-frame comprises gradation lines that define a position of the trailing edge based on a position of the sliding plate.

8. A tool according to claim 7, wherein the sliding plate is reversible in order to determine a nominal position for the trailing edge.

9. A tool according to claim 1, wherein the frame member comprises gradation lines that define a position of the trailing edge based on a position of the at least one sliding member.

10. A tool for measuring a trailing edge position of gas turbine nozzle, the tool comprising:
    a frame member including a main frame and a sub-frame attachable to a plurality of predefined reference points on the nozzle;
    at least one sliding plate disposed in an opening in the sub-frame, the sliding plate being slidable relative to the sub-frame and including a measuring point engageable with the trailing edge; and
    graduations defined on the frame member to identify the trailing edge position based on a position of the sliding plate relative to the graduations when the measuring point is engaged with the trailing edge.

11. A method of measuring a trailing edge position of a gas turbine nozzle, the method comprising:
    securing a frame member to at least one predefined reference point on the nozzle; and
    sliding at least one sliding member relative to the frame member until a measuring point engages the trailing edge, wherein a position of the sliding member relative to the frame member is determinative of the trailing edge position.

12. A method according to claim 11, further comprising identifying a nominal position by setting the at least one sliding member in a predetermined position relative to the frame member and marking the nominal position on the nozzle.

* * * * *